(12) United States Patent
Pizzo et al.

(10) Patent No.: US 8,644,701 B2
(45) Date of Patent: Feb. 4, 2014

(54) CAMERA PLATFORM FOR 3-D PHOTOGRAPHY

(75) Inventors: Stephen Pizzo, Los Angeles, CA (US); Hector Ortega, Los Angeles, CA (US)

(73) Assignee: Truality, LLC, Las Vegas, NV (US)

( * ) Notice: Subject to any disclaimer, the term of this patent is extended or adjusted under 35 U.S.C. 154(b) by 0 days.

(21) Appl. No.: 13/462,063

(22) Filed: May 2, 2012

(65) Prior Publication Data

US 2013/0011128 A1  Jan. 10, 2013

Related U.S. Application Data

(63) Continuation of application No. 12/454,899, filed on May 26, 2009, now Pat. No. 8,180,214.

(60) Provisional application No. 61/128,692, filed on May 23, 2008.

(51) Int. Cl.
  *G03B 35/00* (2006.01)
  *G03B 17/00* (2006.01)

(52) U.S. Cl.
  USPC .......................................... 396/325; 396/428

(58) Field of Classification Search
  USPC .................... 396/325, 329, 333, 419, 428
  See application file for complete search history.

(56) References Cited

U.S. PATENT DOCUMENTS

| 2,838,975 A | 6/1958 | Laube et al. |
| 4,557,570 A | 12/1985 | Hines |
| 4,908,640 A | 3/1990 | Masuda |
| 2011/0085788 A1 | 4/2011 | Pace et al. |

*Primary Examiner* — Christopher Mahoney
(74) *Attorney, Agent, or Firm* — Knobbe, Martens, Olson & Bear LLP

(57) ABSTRACT

"A camera platform for three dimensional photography comprises a first support wall having an inner surface, an outer surface and a fastening end, and a second support wall having an inner surface, an outer surface and a fastening end. The first and second support walls are connected substantially at right angles to each. The inner surface of the first support wall and the inner surface of the second support wall define a quadrant. A fixed camera connector for a first camera is formed on the outer surface of the first support wall, and an adjustable camera connector for a second camera is formed on the outer surface of the second support wall. A beam splitter support frame outside the quadrant between the outer surface of the first support wall and the outer surface of the second support wall supports a beam splitter."

20 Claims, 12 Drawing Sheets

CAMERA PLATFORM FOR 3-D PHOTOGRAPHY

CROSS REFERENCE TO RELATED APPLICATIONS

This patent application is a continuation of U.S. patent application Ser. No. 12/454,899 filed May 26, 2009, which claims the benefit of U.S. Provisional Patent Application No. 61/128,692 filed May 23, 2008, the subject matter of which is incorporated herein by reference in its entirety.

FIELD AND BACKGROUND OF THE INVENTION

This invention relates to a camera platform useful in the context of three-dimensional photography. More particularly, the invention in one aspect is for a camera platform designed for use in three-dimensional photography, the platform being both compact and rigid.

Traditional three dimensional (3-D) camera platforms which use a beam splitter to split the incoming image are typically comprised of two main support plates positioned at generally 90 degrees to one another. One of the support plates may be vertical while the other may be horizontal, or at right angles thereto. Each one of the main support plates will typically hold one of the two cameras used. These two support plates comprise and generally define the overall height and length of the 3-D camera platform in the sense that the cameras are mostly accommodated and contained within the space or quadrant which is defined by these two main support plates.

The two main support plates meet at a common edge where they are connected to each other and edge also this creates the base structure of the beam splitter support box. The support box holds the beam splitter at the required angle and position. Since the two main support structures or plates that support the cameras are usually connected to one another at a point relatively far away from the mounting area of the cameras themselves, a significant amount of material as well as external gusseting or other type of reinforcement is required to make the cameras rigid or substantially fixed with respect to one another.

SUMMARY OF THE INVENTION

According to one aspect of the invention, there is provided a camera platform for three dimensional photography comprising: a first support wall having an inner surface, an outer surface and a fastening end; a second support wall having an inner surface, an outer surface and a fastening end, the first and second support walls being connected to each other along at least a part of their respective fastening ends so as to be substantially at right angles to each other, and the inner surface of the first support wall and the inner surface of the second support wall define a quadrant; a fixed camera connector on the outer surface of the first support wall for connecting to a first camera; an adjustable camera connector on the outer surface of the second support wall for connecting to a second camera; and a beam splitter support frame for holding a beam splitter, the beam splitter support frame being located outside the quadrant between the outer surface of the first support wall and the outer surface of the second support wall.

In one embodiment, the invention further comprises a first camera connected to the fixed camera connector and a second camera connected to the adjustable camera connector.

Preferably, the fixed camera connector and the adjustable camera connector are positioned on the first and second support walls respectively such that when first and second cameras are connected thereto, a line of sight of the first camera will be perpendicular to a line of sight of the second camera.

The camera platform may further comprises at least one gusset between the first support wall and the second support wall, the gusset providing additional rigidity and stiffness between the first and second support walls.

Preferably, the camera platform as claimed further comprises a beam splitter mounted in the beam splitter support frame. The beam splitter is preferably mounted in the beam splitter support frame, the beam splitter being positioned between an image to be captured by the first and second cameras, the beam splitter partially reflecting the image to either the first or second camera and partially transmitting the image to either the second or first camera. In one form, the beam splitter reflects about 50% of the image to be captured to the first camera and transmits about 50% of the image to be captured to the second camera.

The fixed camera connector may comprise apertures and hardware on or in the first support wall for releasably mounting a camera to the outer surface of the first support wall.

The adjustable camera connector may comprise a fixed track on the outer surface of the second support wall and a movable linear bearing associated with the fixed track and movable with respect to the fixed track, the second camera being connectable to the linear bearing. The fixed track may comprise a pair of parallel rails and the linear bearing may comprise a pair of recesses, the rails being received in the recesses in the linear bearing.

Preferably, the camera platform further comprises a drive motor for moving the linear bearing along the fixed to track to a desired position thereon. The drive motor may drive a circular gear, and the linear bearing may have a geared section. The circular gear will engage the geared section of the linear bearing such that rotation of the circular gear by the drive motor moves the linear bearing linearly to a selected position where the camera may be desired.

In one form, the beam splitter is comprised of a semi-silvered water white material.

Preferably, the fixed camera connector and first camera connected thereto are positioned adjacent to the fastening ends of the first and second support walls, and the adjustable camera connector and second camera connected thereto are also positioned adjacent to the fastening ends of the first and second support walls.

In one embodiment, the beam splitter support frame comprises a vertical component substantially parallel to the vertical support wall and a horizontal component substantially parallel to the horizontal support wall, the beam splitter support frame having a first fastening bracket on the vertical component and a second fastening bracket on the horizontal component, the first and second fastening brackets being located and configured to receive the beam splitter so that the beam splitter will be at substantially a 45 degree angle with respect to the horizontal component and the vertical component.

In another form, the camera platform further comprises at least one load bearing side wall to provide strength to the camera platform.

According to another aspect of the invention, there is provided a method of constructing a camera platform for use in three dimensional photography, the method comprising: providing a first support wall having an inner surface, an outer surface and a fastening end; connecting a second support wall to the first support wall, the second support wall having an inner surface, an outer surface and a fastening end, the first and second support walls being connected to each other along at least a part of their respective fastening ends so as to be substantially at right angles to each other, and the inner surface of the first support wall and the inner surface of the second support wall define a quadrant; mounting a fixed camera connector on the outer surface of the first support wall for connecting to a first camera; mounting an adjustable camera connector on the outer surface of the second support wall for connecting to a second camera; and locating a beam splitter support frame for holding a beam splitter on either one or both of the first support wall and the second support wall, the beam splitter support frame being located outside the quadrant and between the outer surface of the first support wall and the outer surface of the second support wall.

According to yet a further aspect of the invention, there is provided a method of capturing images using a camera platform for three dimensional photography comprising: mounting a first fixed camera on an outer surface of a first support wall having an inner surface, an outer surface and a fastening end; mounting a second movable camera on an outer surface a second support wall having an inner surface, an outer surface and a fastening end, the first and second support walls being connected to each other along at least a part of their respective fastening ends so as to be substantially at right angles to each other, and the inner surface of the first support wall and the inner surface of the second support wall define a quadrant; positioning a beam splitter support frame and a beam splitter between the line of sight of the first and second cameras, both the beam splitter support frame and beam splitter being located outside the quadrant and between the outer surface of the first support wall and the outer surface of the second support wall, wherein the beam splitter partially transmits an image to be captured to one of the first and second cameras, and partially reflects an image to be captured to one of the second and first cameras; and
moving the movable camera to a desired position to achieve the targeted stereoscopic three dimensional effect.

Preferably, the beam splitter transmits about 50% of the image to be captured and reflects about 50% of the image to be captured.

In one important aspect, therefore, the invention is for a camera platform upon which is mounted two or dual cameras, the cameras being positioned relative to each other so as to achieve a three-dimensional effect. Typically, such camera platforms of the invention have a beam splitter positioned optically between the two mounted cameras, to split the incoming image and direct it toward both of the cameras mounted on the camera support. Fine adjustment of the relative positions of the cameras can be made to achieve the desired precise stereoscopic effect.

Compactness is clearly an advantage to a camera operator, especially when coupled with light weight and ease of operation, since operators are often in challenging environments and cramped for space. Moreover, the compactness and light weight characteristics should preferably not compromise the rigidity of the camera platform or support, and this is particularly important in three dimensional photography, since resilience or relative displacement of different portions of the support platform may move the cameras mounted on the platforms relative to each other resulting in unacceptable images.

As such, the present invention in one embodiment provides for a camera platform useful for three-dimensional photography and which is capable of receiving and holding dual cameras, the camera platform being configured for compactness, strength, rigidity and light weight.

According to one aspect of the invention, there is provided a three-dimensional camera platform comprising a first support for holding a first camera which is fixed relative to the first support, a second support for holding a second camera which can be selectively moved relative to the second support and fixed in position on the second support, and a beam splitter mounted on a frame forming a part of the camera platform.

Preferably, the first support is generally planar and has peripheral edges, an inside surface and an outside surface, and the second support is generally planar and has peripheral edges, an inside surface and an outside surface. The first and second supports are mounted at substantially right angles with respect to each other, and preferably connected along one of their common edges. When so connected, the inside surface of the first support and the inside surface of the second support generally define a quadrant. Preferably, the first camera is mounted on the outside surface of the first support and the second camera is mounted on the outside surface of the second support.

In a preferred embodiment, the first and second supports have suitable apertures and/or mounting hardware for releasably mounting the first and second cameras thereto.

Preferably, a linear bearing is mounted on the second support and the second camera is attached releasably to the linear bearing. A drive motor selectively drives or moves the linear bearing, and the second camera when mounted thereon, in a linear pathway so that the second camera can be positioned at the desired location to achieve the necessary three-dimensional stereoscopic effect. The drive motor may be connected to the linear bearing by means of a gear arrangement, preferably but not necessarily a circular gear on the motor and a linear gear on the linear bearing.

The frame may be mounted on or integral with either one of the first or second supports, or indeed both of these supports. The beam splitter is preferably mounted on the frame or on one or both of the supports in the quadrant opposite to that defined by the inner surfaces of the first and second supports of the platform respectively.

The camera platform of the invention will preferably hold the first and second cameras relative to each other such that the lens of one camera is directed vertically when the lens of the other camera is directed horizontally. The beam splitter will be positioned optically between the respective lenses. In a preferred embodiment, the beam splitter is positioned in the line of sight of the first camera as well as the line of sight of the second camera. The movable camera can be offset at the desired distance from the fixed camera to achieve the targeted three-dimensional effect chosen by the operator.

The camera platform of the present invention preferably has a central support that is comprised of a single right angle structure that occupies the space between the vertical and horizontal camera positions rather than the wrapping around the external boundary of the two cameras. This arrangement makes possible the construction of a significantly smaller system than the traditional arrangement. The beam splitter is constrained by a skeletal structure that is tied to the central camera support by two shear walls on the left side and right side of the 3-D camera platform. This feature may make the platform somewhat more rigid, the same time preferably using less material than that used in the traditional platform construction.

Since the precise optical line-up and control of the two LOS (lines of sight) of the first and second cameras is essential to the effective capture of stereo pairs of images, rigidity in construction becomes one of the most important features of a 3-D camera platform. There are at least two principal areas or situations where mechanical compliance or the lack of rigidity between the first camera and the second camera, when both are mounted on the platform, may result in the compromise of the effect of the stereo pairs of images captured by the first and second cameras respectively. Two of these situations are discussed below and are as follows:

(a) A first situation occurs when the platform is operated in a very dynamic environment, such as a camera car or other vehicle traveling over uneven terrain, possibly at high speeds. This situation subjects the platforms to varying positive and negative gravitational loads which may cause any part of the camera platform, which will be of sufficient mass, to flex or twist with respect to the rest of the system. Normally, it is flexing or deforming of the camera platform whereby one camera twists with respect to the other which causes relative movement between the first and second cameras and thus destroys the otherwise precise optical alignment between the cameras.

(b) A second situation occurs when the camera platform operator actuates the servo control to adjust or change the inter-axial spacing between the first and the second cameras during the shot to vary the amount of depth or stereo effect for editorial effect. When there is insufficient mechanical structure or reinforcement to constrain or limit the line of sight of the moving camera relative to the set line of sight of the fixed camera, the servo is able to reposition the line of sight to the correct setting in a single axis only. The result may be that the line of sight of the moving camera is momentarily displaced angularly, thereby disrupting the stereo effect produced by the precise relative locations of the first and second cameras, until the moving camera has stopped and settled back into its aligned set position for achieving the desired stereo effect.

Regardless of how or why the two cameras are momentarily interrupted from capturing precise stereo pairs, the consequence on the production budget is usually the same. The shot must either be recreated under more benign conditions or significant time and money must be spent in post-production tracking and realigning the images. If the images are not re-shot or repaired, the audience or viewers of the images, if subjected to enough of these misaligned shots, may complain of eye strain and headaches.

Making a system rigid enough normally comes at the expense of making the system lightweight. But of course the system needs to be light enough so that it can be supported and moved by traditional film making support equipment designed for conventional and two-dimensional cameras. Once enough material or structure has been removed to satisfy the weight requirement, the camera platform may be too flexible or resilient to be used effectively on a moving vehicle or platform. It may also be too flexible to allow inter-axial changes to be made to the movable camera on the platform to vary the stereo effect which may need to be effected during a shot, and this is an important and desirable tool which could be available to a film director to create the type of effect being sought. The camera platform of the present invention thus offers not only a rigid construction, but one which is also preferably lightweight and stiffer when compared to many traditional systems providing platforms for dual cameras used in this type of setting.

BRIEF DESCRIPTION OF THE DRAWINGS

In the drawings attached to this specification.

DETAILED DESCRIPTION OF THE INVENTION

Reference is now made to the accompanying drawings which show a traditional type camera platform as well as various embodiments and features of a camera platform in accordance with the present invention.

Figure 1:
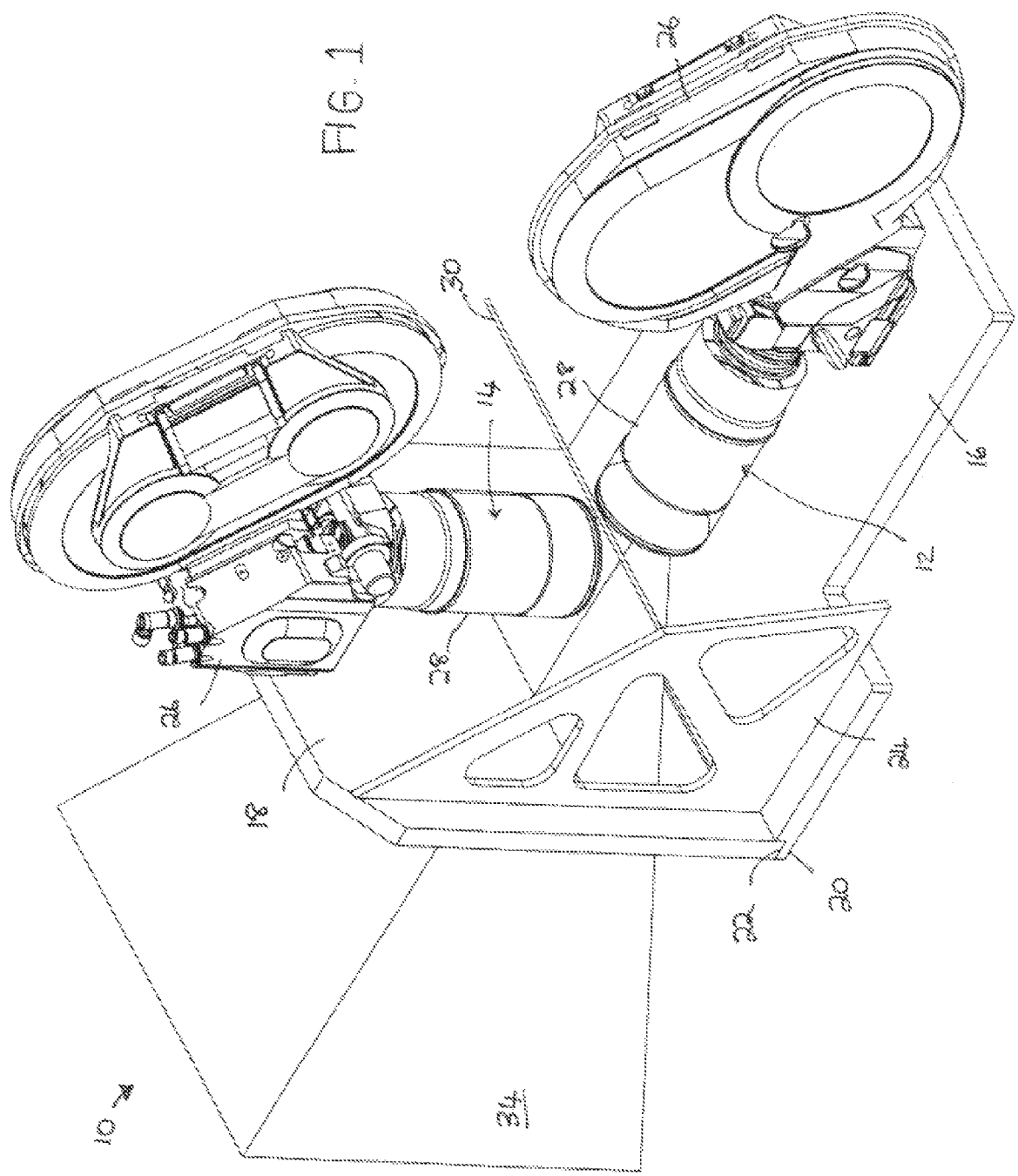
FIG. 1 is a top perspective view of a traditional or conventional type dual camera platform, in which it can be seen that the two cameras are mounted substantially within the space defined by the vertical and horizontal plates and the reinforcing side plates, the beam splitter being located therebetween.
Figure 2:
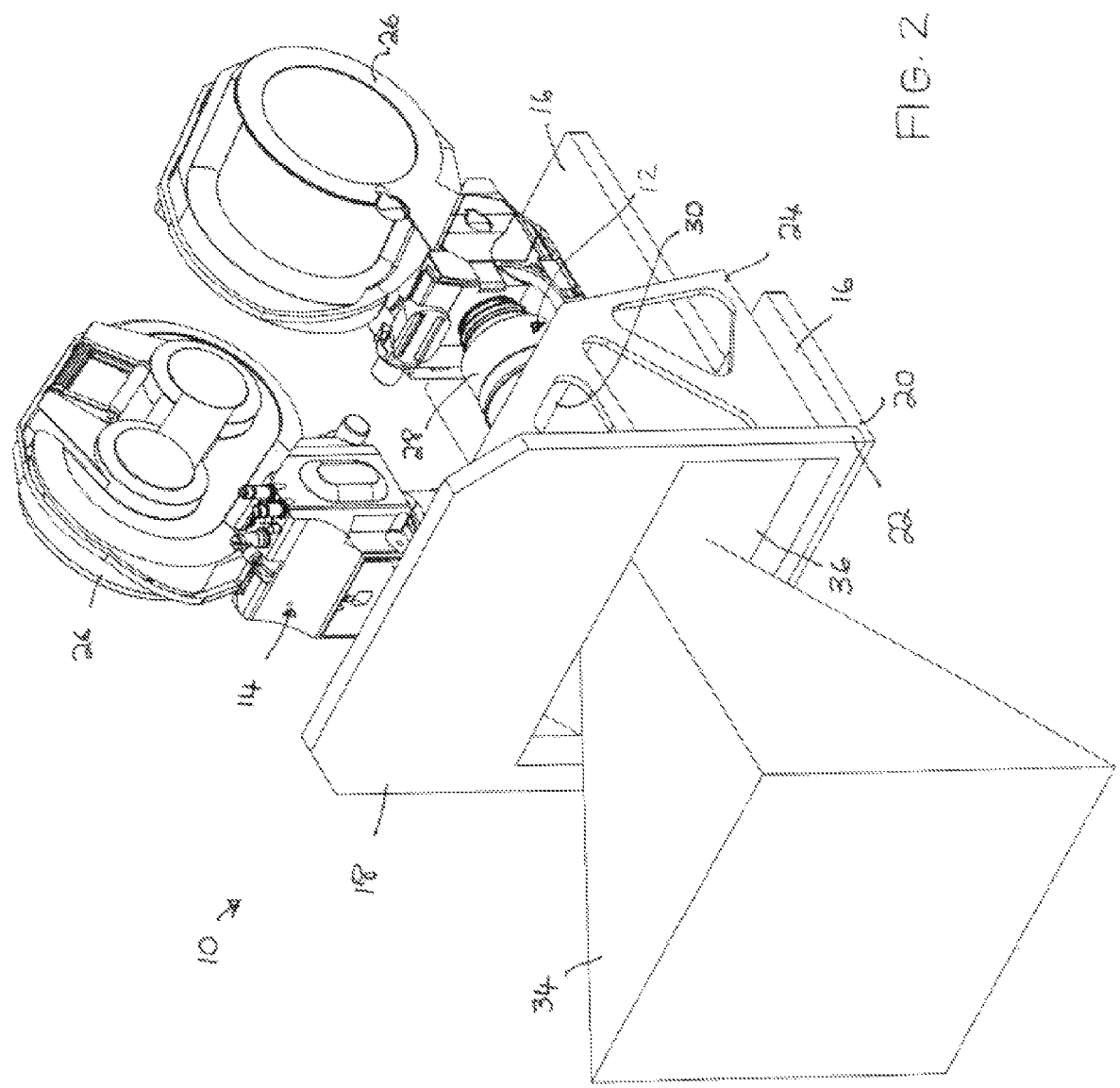
FIG. 2 is a front perspective view of the camera platform as shown in FIG. 1 of the drawings, with the two cameras mounted thereon.
Figure 3:
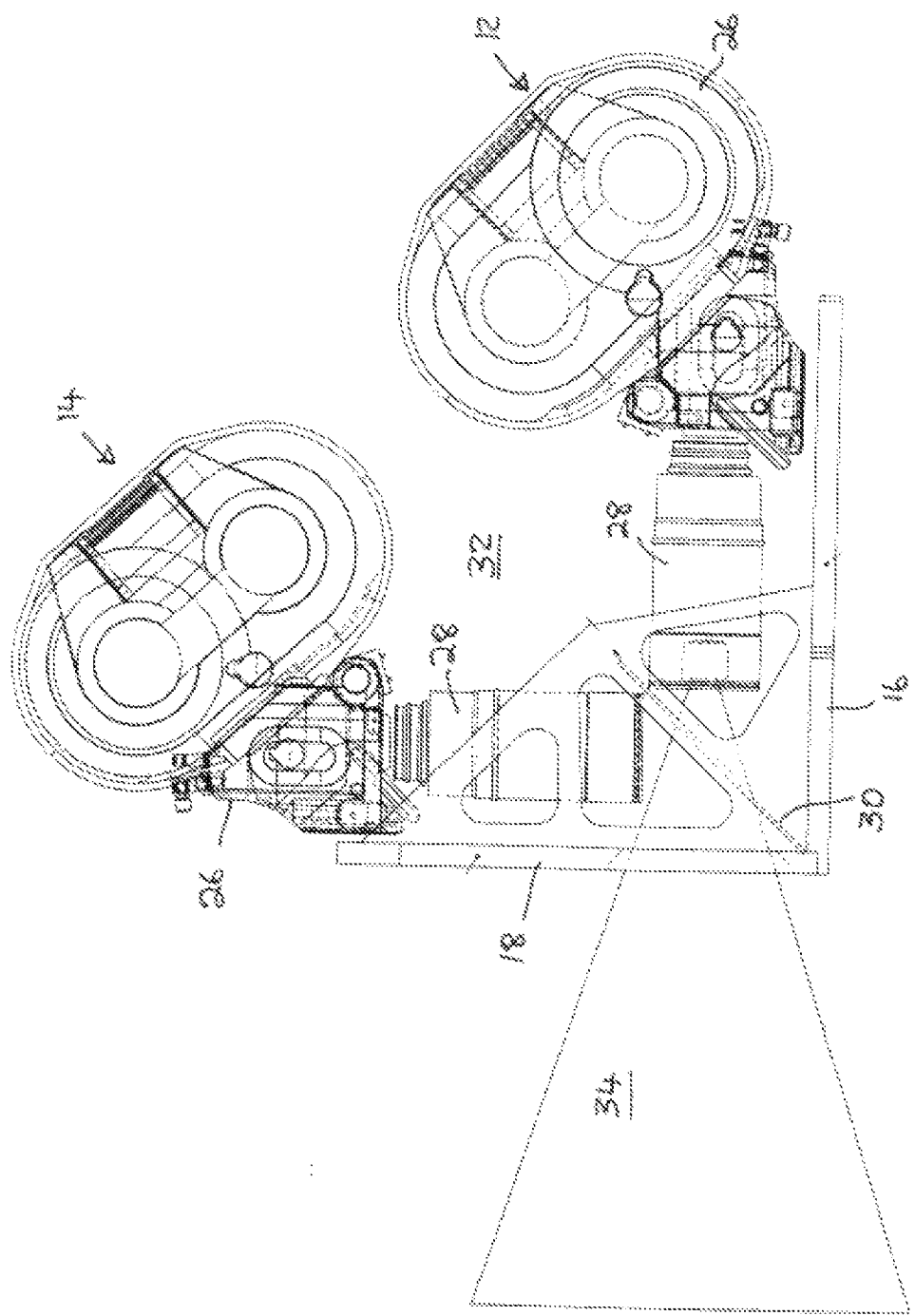
FIG. 3 is a side view of the traditional camera platform shown in FIGS. 1 and 2 of the drawings.

In FIGS. 1, 2 and 3 of the drawings, there is shown generally a traditional camera mount or platform which has been used for mounting a pair or dual cameras for the purpose of capturing three dimensional type images. Only the general features and structure of the traditional camera mount 10 are shown in the drawings. These figures show a camera platform 10 which supports a first generally horizontal camera 12 and a second generally vertical camera 14. The cameras 12 and 14 are mounted at right angles or 90 degrees with respect to each other.

The camera platform 10 comprises a base or horizontal support wall 16 and a vertical support wall 18 at right angles thereto. The base support wall 16 has a front edge 20 and the vertical support wall 18 has a lower edge 22 and the support walls 16 and 18 are fastened or connected to each other along their front edge 20 and lower edge 22 respectively. A bracket or gusset 24 is provided at at least one end of the camera platform 10 to provide strength or stiffness between the base support wall 16 and the vertical support wall 18 of the camera platform 10. This is necessary to minimize the amount of undesirable movement which may take place between the cameras 12 and 14 when the camera platform is subject to forces or torque in the course of filming. As mentioned above, such relative movement between the cameras 12 and 14 may cause an image which is defective or inadequate and may need to be retaken or later edited, both time consuming and expensive procedures, and neither of which may completely cure the problem caused by this relative movement between the cameras.

Each of the cameras 12 and 14 comprises a body 26 and lens 28, as shown. The body 26 of each of the cameras 12 and 14 is connected to either the base wall 16 or the vertical wall 18. Usually, one of the cameras will be fixed to its support wall while the other will be movable to selected positions on its support wall in order to achieve the desired stereoscopic three dimensional effect.

A beam splitter 30 is provided on the camera platform 10 and is positioned so as to be in the line of sight of both cameras 12 and 14. The beam splitter 30 has one end attached at generally the front edge 20 and lower edge 22 and extended into the quadrant 32 defined by the support walls 16 and 18. The support walls 16 and are substantially at right angles to each other. The beam splitter 30 is mounted at a 45 degree angle between the support walls 16 and 18. The beam splitter 30 is a 50/50 beam splitter, providing about 50% light transmission and 50% light reflectance.

The camera platform provides a field of view. Light enters from the field of view 34 and passes through an aperture 36 in the vertical support wall 16. About 50% of the light passes through the beam splitter 30 and is captured as an image by the horizontal camera 12, while about 50% of the light is reflected by the beam splitter 30 and is captured as an image by the vertical camera 14. The cameras 12 and 14 are offset from each other by selectively adjusting the position of one of the cameras, and the slightly different or offset images from the two cameras 12 and 14 represents left or right eye viewing respectively, thereby providing the three dimensional stereoscopic effect.

Reference is now made to FIGS. 4 to 12 of the drawings which shows a camera platform configured and constructed in accordance with the present invention.

Figure 4:
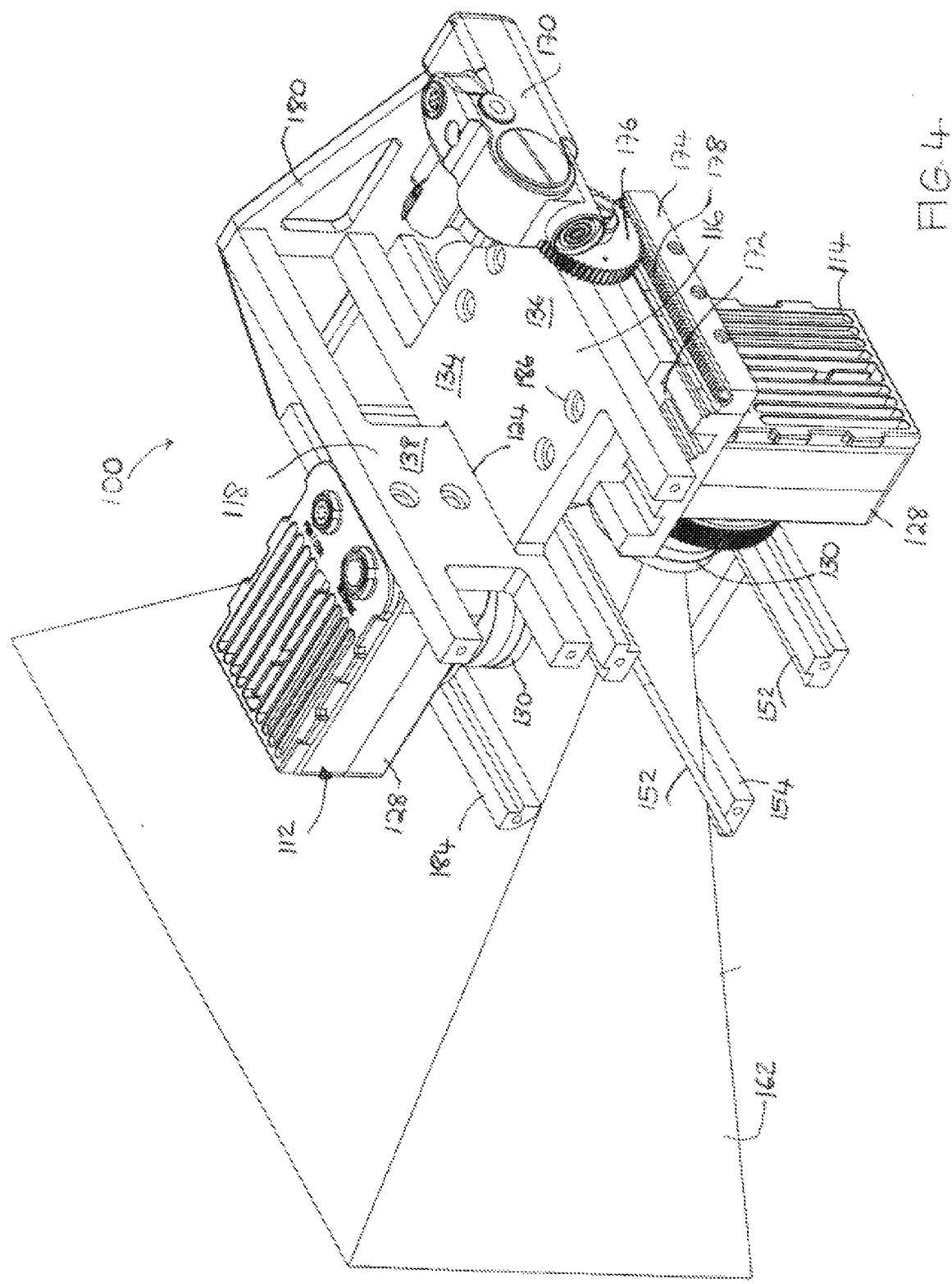
FIG. 4 is a top perspective view of one embodiment of a camera platform constructed and configured in accordance with the present invention.
Figure 5:
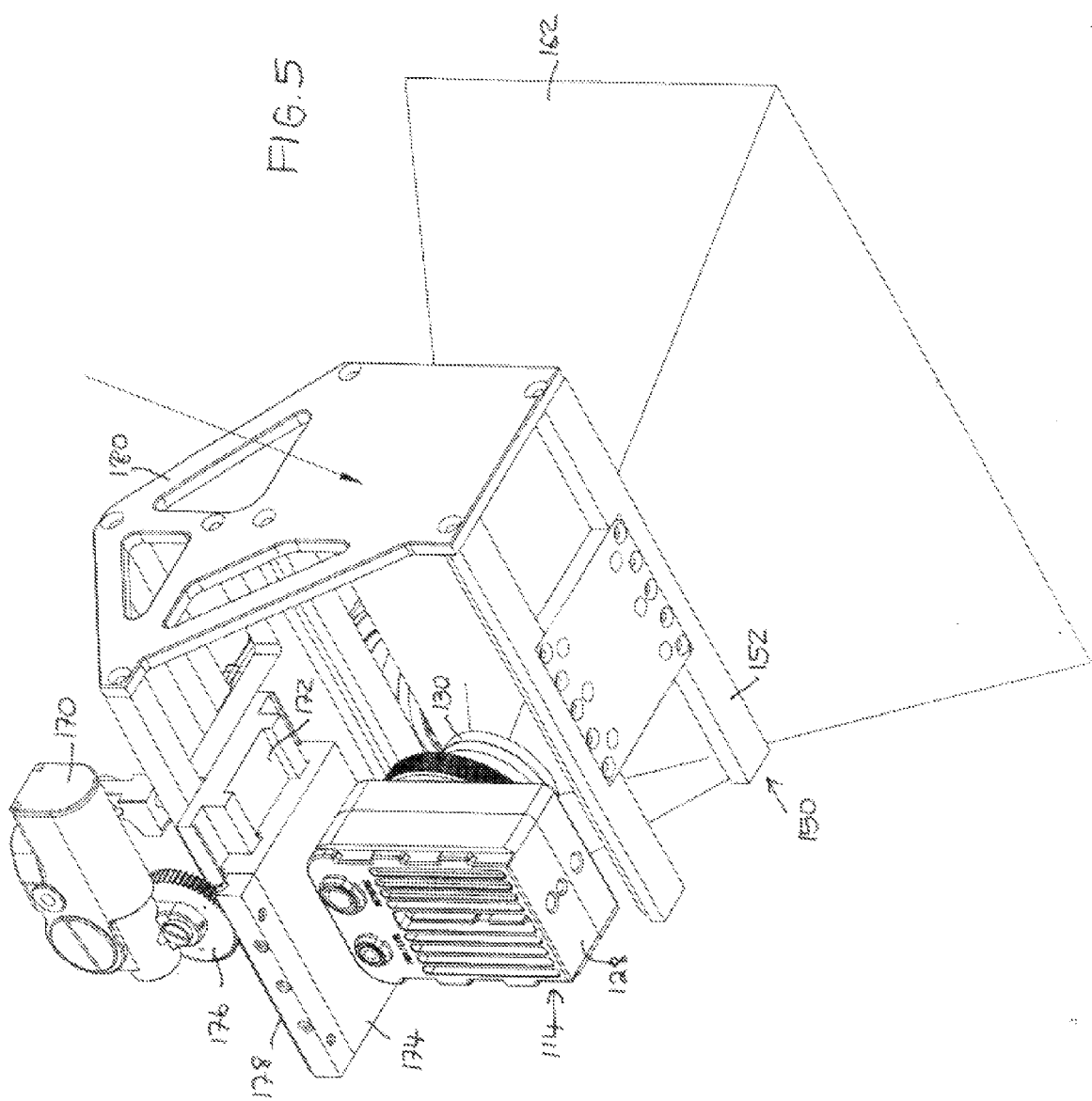
FIG. 5 is a bottom perspective view of the camera platform in accordance with the invention.
Figure 6:
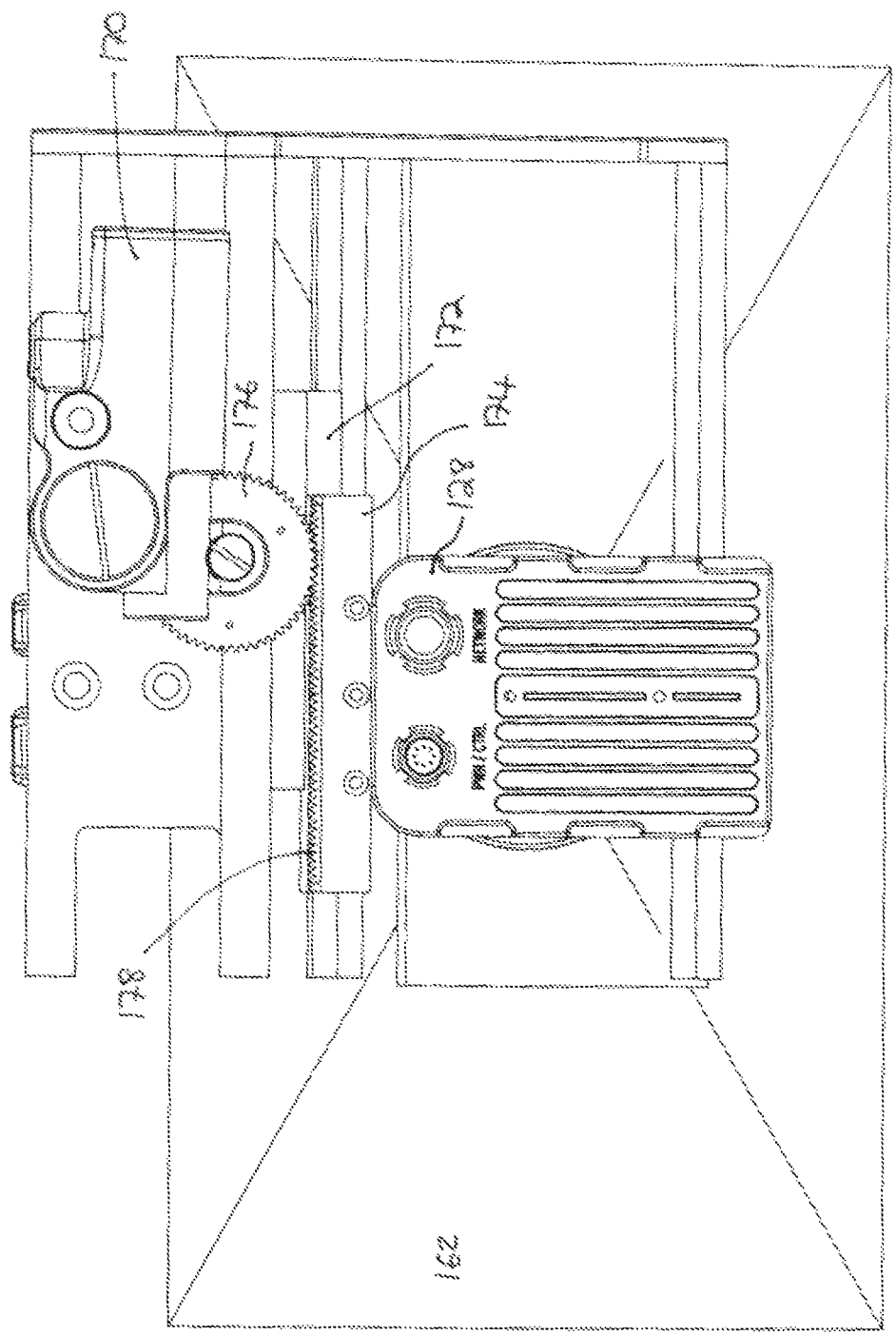
FIG. 6 is a rear end view of the camera platform of the invention, showing clearly the mounting of the movable camera and its associated linear bearing and drive motor.
Figure 7:
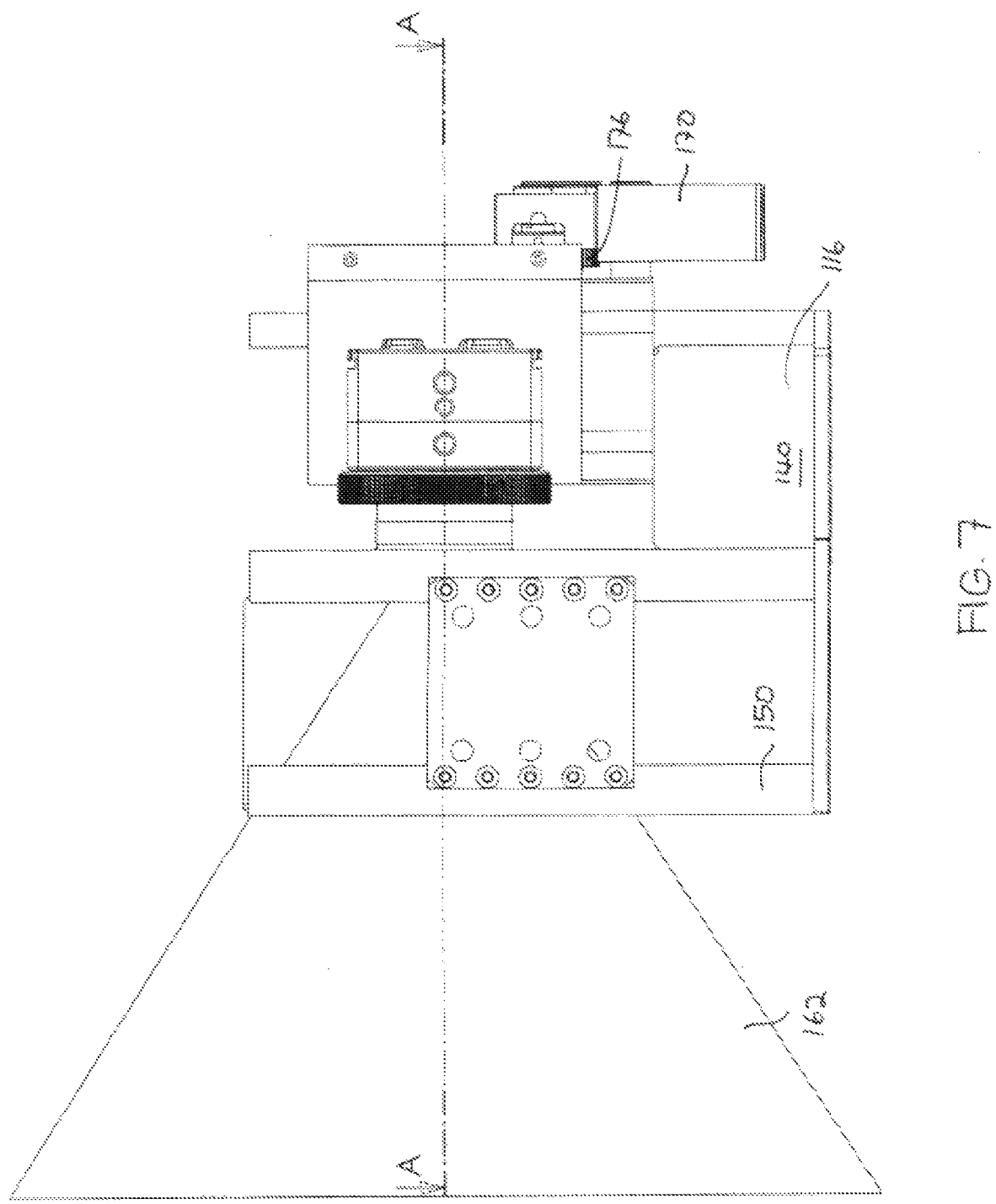
FIG. 7 is a bottom view of the camera platform shown in FIG. 4 of the drawings.
Figure 8:
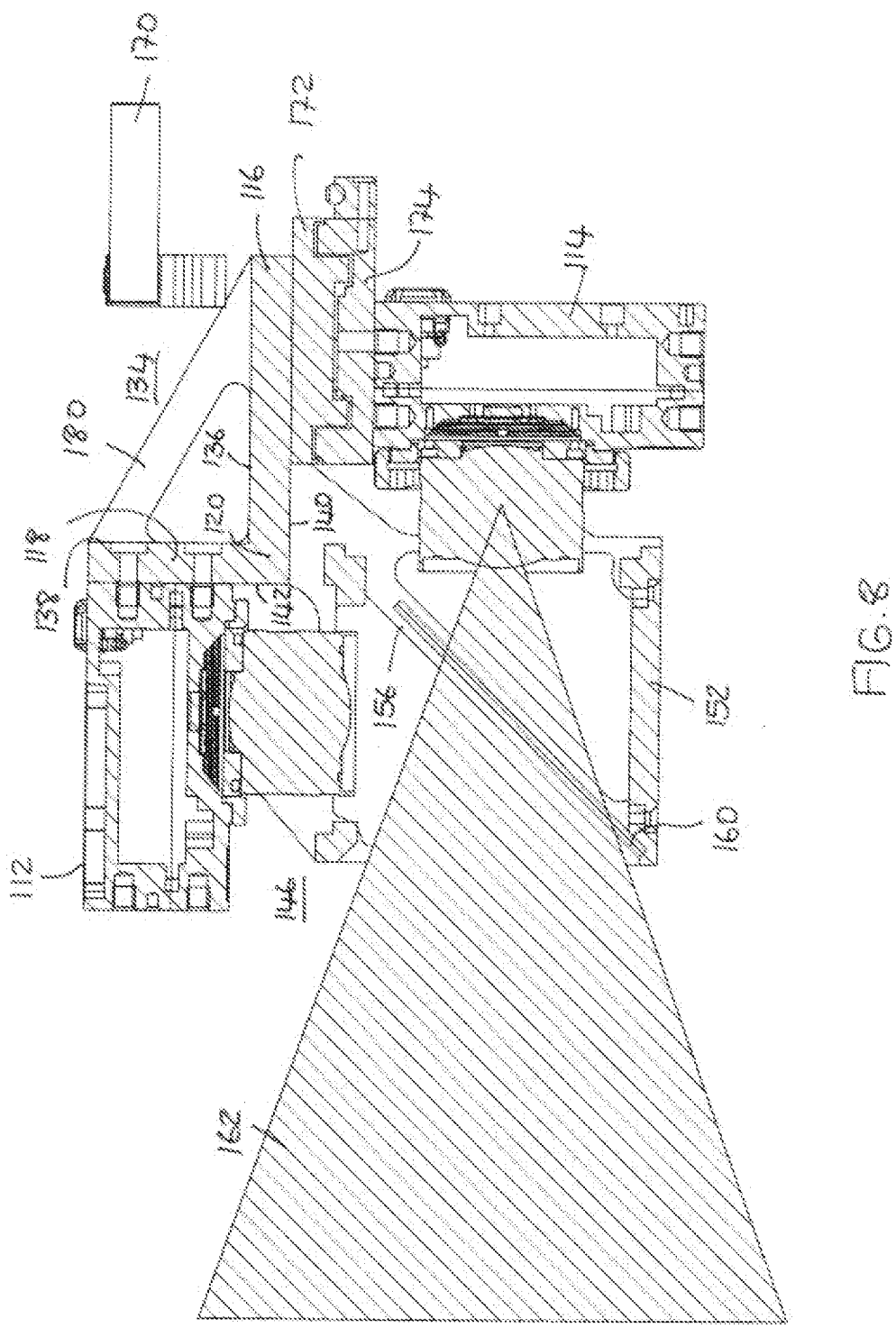
FIG. 8 is a cross-section of the camera platform of the invention taken along line A-A in FIG. 7 of the drawings.

As seen for example in FIG. 4 of the drawings, there is shown a camera platform 100 in accordance with one aspect of the present invention. The camera platform 100 has mounted thereon a first fixed camera 112 and a second movable camera 114.

The camera platform 100 is made up of two main components. There is a generally horizontal support plate 116 and attached thereto a generally vertical support plate 118. The horizontal support plate 116 has a forward edge 120 and the vertical support plate 118 has a lower edge 122. The support plates 116 and 118 are suitably and connected to each other in a rigid manner along a join 124 where the forward edge 120 of the support plate 116 and the lower edge 122 of the support plate 118 meet. As will described in further detail below, the movable camera 114 is adjustably mounted on the horizontal support plate 116 while the fixed camera 112 is mounted on the vertical support plate 118. Each camera 112 and 114 has a body portion 128 and a lens portion 130.

The horizontal support wall 116 and the vertical support wall 118 each have an inner surface 136 and 138 respectively and these together define a quadrant 134. Further, the horizontal support wall 116 and the vertical support wall 118 each have an outer surface 140 and 142 respectively and these together define the remaining three quadrants 146. The camera 112 is attached to the outer surface 142 of the vertical support wall 118, while the camera 114 is attached to the outer surface 140 of the horizontal support wall 116. This arrangement of the cameras 112 and 114 on the camera platform 100 provides the invention with considerable flexibility and advantages. The cameras 112 and 114 are no longer confined in the quadrant 134, as was the case with conventional camera platforms. Further, the camera can be attached much nearer the join 124 between the support walls 116 and 118 and this facilitates additional rigidity and stiffness to reduce relative camera movement during shooting. As will be described below, this configuration also opens up greater control and better assembly of the motors, gears and other components used to move the movable camera to the desired location to achieve the target three dimensional effect. Yet another advantage of this construction is that apertures are not need in the support walls to allow images from the line of sight to reach the lens. This means that the camera platform can be constructed of lighter, thinner materials without compromising rigidity, stiffness and strength.

A beam splitter support frame 150 is provided and supported by the support walls 116 and/or 118. The beam splitter support frame 150 comprises a base member 152 having an outer end 154. A clamp bracket 156 bracket is positioned more or less diametrically opposite the outer end 154. A bean splitter 160 is fastened, preferably in a releasable manner, between the outer end 154 and the clamp bracket 156. The beam splitter 160 is at 45 degrees to the base member 152 and is positioned between the lenses 130 of the two cameras 112 and 114 such that about 50% of the incoming image is reflected to be captured by the camera 112 while about 50% of the incoming image is transmitted through the beam splitter 160 to be captured by the camera 114.

The beam splitter 160 may be comprised of any suitable material, one example of which is semi-silvered water white material.

Figure 9:
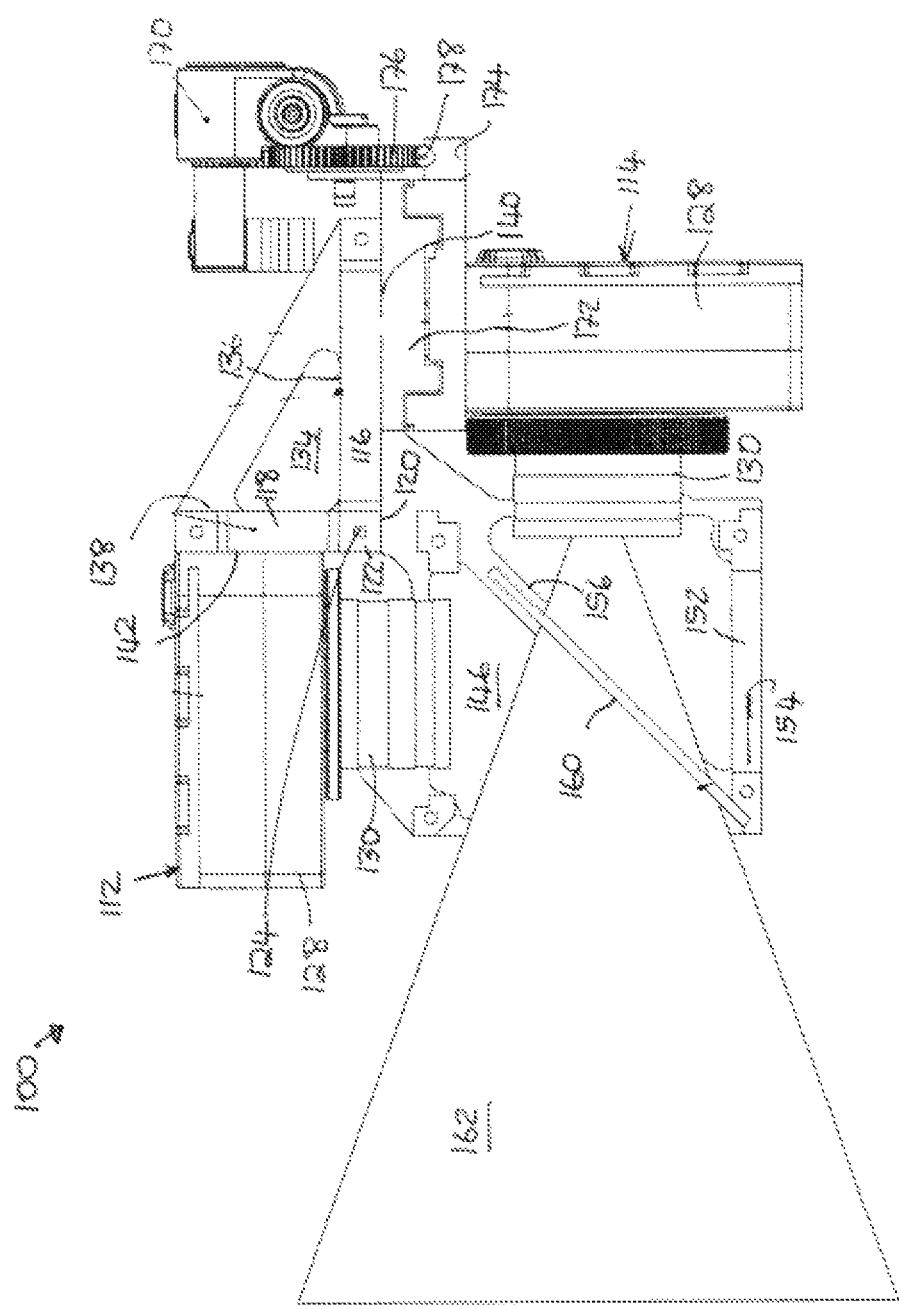
FIG. 9 is a side view of the camera platform of the invention as shown in FIG. 4 of the drawings.
Figure 10:
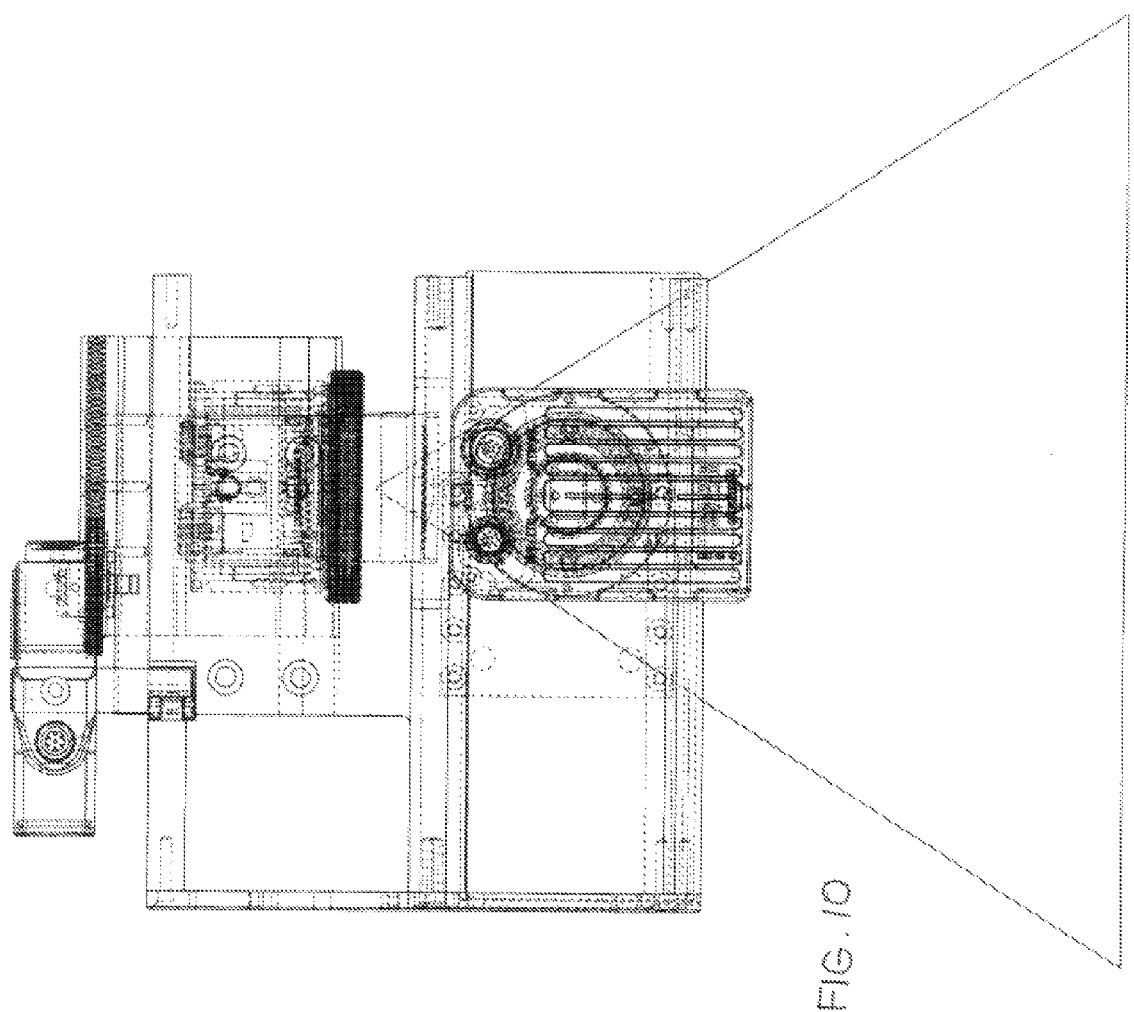
FIG. 10 is a top view showing details of the structure of the camera platform in accordance with one embodiment of the invention.
Figure 11:
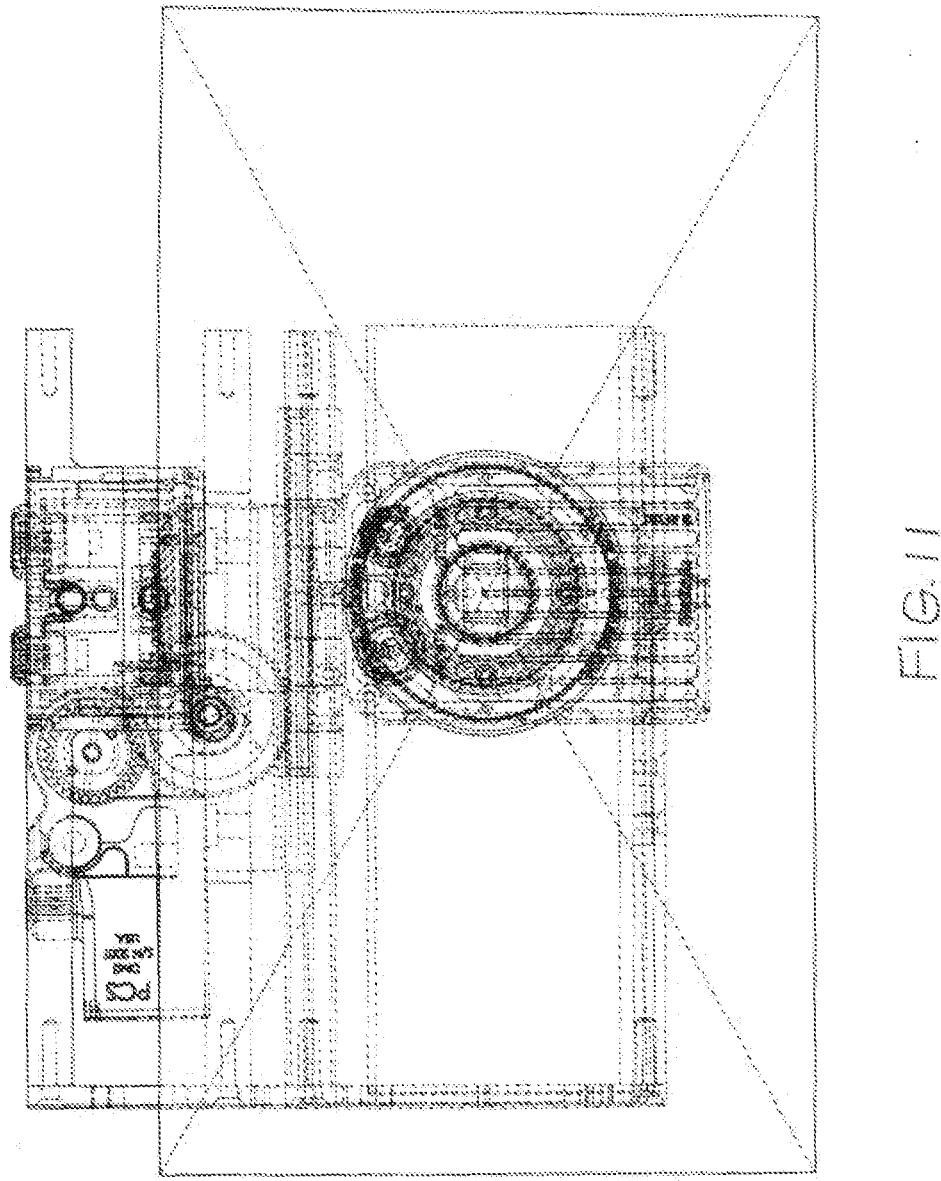
FIG. 11 is a front view showing details of the structure of the camera platform in accordance with one embodiment of the invention.
Figure 12:
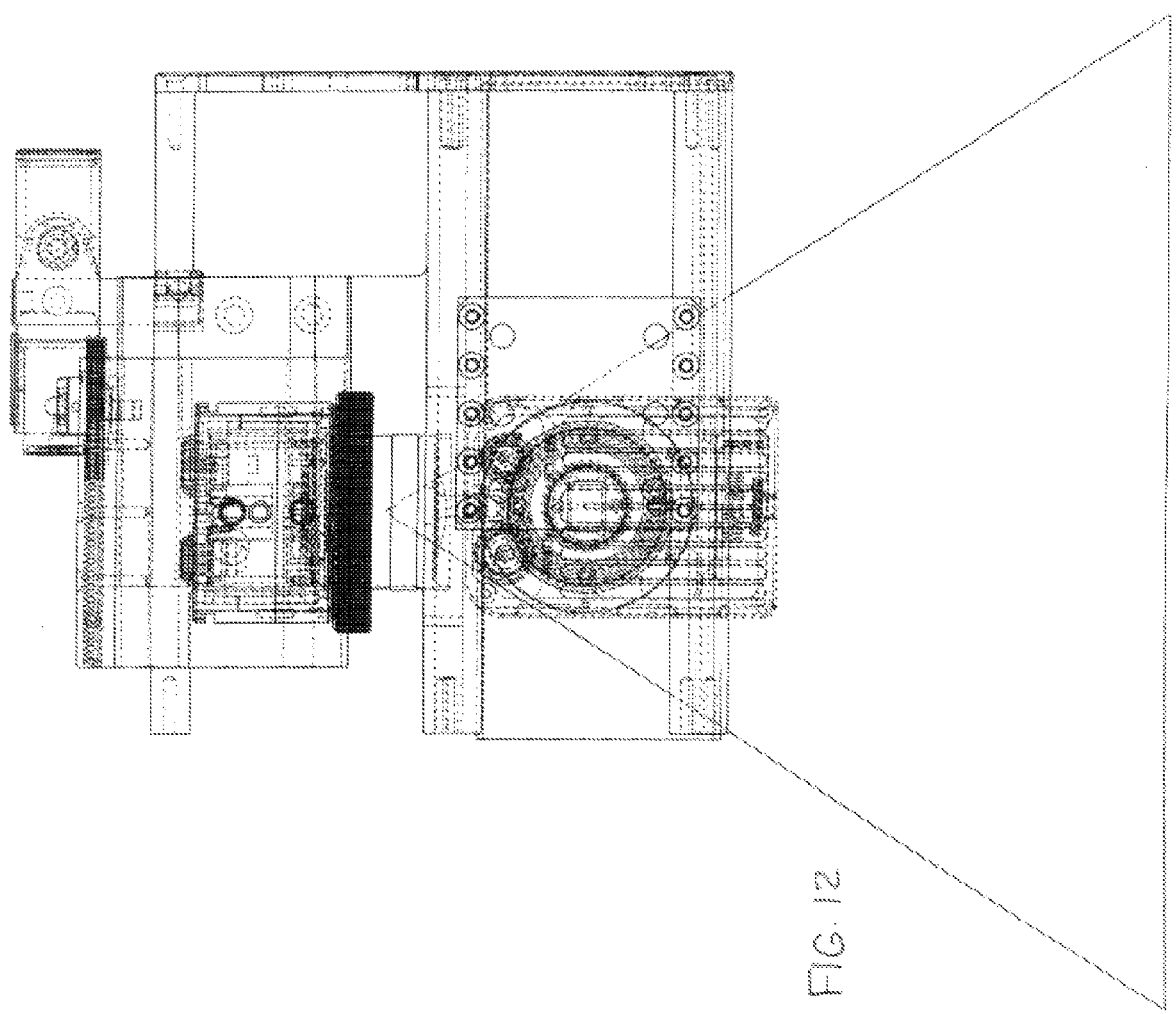
FIG. 12 is a back view showing details of the structure of the camera platform in accordance with one embodiment of the invention.

It will be seen, for example in FIG. 9 of the drawings, that the field of view 162 present an image which reaches the beam splitter 160 substantially unobstructed so that the beam splitter 160 can both reflect and transmit the image to the respective cameras 112 and 114 respectively as already described above.

As mentioned, the camera 114 is capable of being moved and its position can thus be adjusted to achieve the targeted three dimensional stereoscope effect. In the embodiment shown in the drawings, the camera 114 is moved by a drive motor 170.

The support wall 116 has on the outer surface 140 thereof a track 172 upon which is slidably mounted a linear bearing 174. The camera 114 itself is mounted on the linear bearing 174 and is thus movable relative to the support wall 116. The drive motor 170 is mounted on the inner surface 136 of the support wall 116 and has a circular gear 176 which engages with a linear gear 178 on the linear bearing 174 in a rack and pinion type configuration. Rotational motion of the circular gear 176 on the linear gear 178 converts rotational movement into linear movement, so that activation of the servo motor 170 has the effect of moving the movable camera 114 to adjust the stereoscopic effect of the combined cameras 112 and 114 to create the desired three-dimensional effect. The incoming image represented by the field of view enclosure 162 falls on the beam splitter 160 and about 50% thereof is transmitted through the beam splitter 160 and captured as an image in the camera 114 while about 50% thereof is reflected by the beam splitter 160 and is diverted to the camera 112. The drive motor 170, track 172 and linear bearing 178 in combination can be activated and adjusted to achieve appropriate linear displacement of the movable camera 114 this producing the desired three dimensional effect.

The camera platform 100 also has side walls or gussets 180 effectively between the support wall 116 and the support wall 118, and this bracket 180 helps to impart rigidity and inflexibility to the camera platform 100. This is most important since, a already mentioned above, any twisting or relative movement of components of the camera platform 100 will affect the relative positions of the cameras 112 and 114 and this in turn impacts the stereo effect of the image being captured by the cameras to detrimental effect.

Appropriate mountings 184 and apertures 186 are provided on the camera platform 100 mainly in the horizontal and vertical support wall 116 and 118 for the fastening and connection of hardware such as the linear bearing, motor, cameras and other accessories.

An important feature of one embodiment of the invention is the fact that the cameras 112 and 114 are mounted not in the quadrant space 134 defined by the camera support walls 116 and 118 but rather in the space 146 outside of this quadrant 134. The advantage of such a feature becomes evident when the embodiments of the invention illustrated in, for example, FIGS. 4 and 5 of the drawings, are compared with the traditional more conventional camera platform as illustrated in FIGS. 1 and 2 of the drawings. Some other benefits and advantages of this configuration have already been mentioned above. This construction therefore facilitates a compact, lightweight, rigid, convenient to use camera platform 100, which also allows easy attachment and removal of hardware.

This structure also allows for a smaller footprint of the camera platform 100, more rigid connections, camera connections closer to the join 124 between the support walls 116 and 118, and the more stable mounting of the beam splitter 160 on the camera platform 160.

The invention is not limited to the precise details described above and many variations and different embodiments may be provided within the scope of the invention.

The invention claimed is:

1. A camera platform for three dimensional photography comprising:
    a first support wall having an inner surface, an outer surface and a fastening end;
    a second support wall having an inner surface, an outer surface and a fastening end, the first and second support walls being connected to each other along at least a part of their respective fastening ends so as to be substantially at right angles to each other, and the inner surface of the first support wall and the inner surface of the second support wall define a quadrant;
    a fixed camera connector coupled to the first support wall, the fixed camera connector configured to connect to a first camera and to fixably hold the first camera above the outer surface of the first support wall;
    an adjustable camera connector coupled to the second support wall, the adjustable camera connector configured to connect to a second camera and to hold the second camera above the outer surface of the second support wall, wherein the adjustable camera connector is adjustable to move the second camera along a line that is substantially parallel to the outer surface of the second support wall and that is substantially orthogonal to a primary optical axis of a lens of the second camera; and
    a beam splitter support configured to hold a beam splitter such that the beam splitter is outside the quadrant between the outer surface of the first support wall and the outer surface of the second support wall.

2. A camera platform as claimed in claim 1 further comprising a first camera connected to the fixed camera connector and a second camera connected to the adjustable camera connector.

3. A camera platform as claimed in claim 2 further comprising a beam splitter mounted in the beam splitter support frame, the beam splitter being positioned between an image to be captured by the first and second cameras, the beam splitter partially reflecting the image to either the first or second camera and partially transmitting the image to either the second or first camera.

4. A camera platform as claimed in claim 3 wherein the beam splitter reflects about 50% of the image to be captured to the first camera and transmits about 50% of the image to be captured to the second camera.

5. A camera platform as claimed in claim 3 wherein the beam splitter is comprised of a semi-silvered water white material.

6. A camera platform as claimed in claim 2 wherein the fixed camera connector and first camera connected thereto are positioned adjacent to the fastening ends of the first and second support walls.

7. A camera platform as claimed in claim 2 wherein the adjustable camera connector and second camera connected thereto are positioned adjacent to the fastening ends of the first and second support walls.

8. A camera platform as claimed in claim 1 wherein the fixed camera connector and the adjustable camera connector are positioned on the first and second support walls respectively such that when first and second cameras are connected thereto, a line of sight of the first camera will be perpendicular to a line of sight of the second camera.

9. A camera platform as claimed in claim 1 further comprising at least one gusset between the first support wall and the second support wall, the gusset providing additional rigidity and stiffness between the first and second support walls.

10. A camera platform as claimed in claim 1 further comprising a beam splitter mounted in the beam splitter support frame.

11. A camera platform as claimed in claim 1 wherein the fixed camera connector comprises apertures and hardware on or in the first support wall for releasably mounting a camera to the outer surface of the first support wall.

12. A camera platform as claimed in claim 1 wherein the adjustable camera connector comprises a fixed track on the outer surface of the second support wall and a movable linear bearing associated with the fixed track and movable with respect to the fixed track, the second camera being connectable to the linear bearing.

13. A camera platform as claimed in claim 12 wherein the fixed track comprises a pair of parallel rails and the linear bearing comprises a pair of recesses, the rails being received in the recesses in the linear bearing.

14. A camera platform as claimed in claim 13 further comprising a drive motor for moving the linear bearing along the fixed to track to a desired position thereon.

15. A camera platform as claimed in claim 14 wherein the drive motor drives a circular gear, the linear bearing has a geared section, and the circular gear engages the geared section of the linear bearing such that rotation of the circular gear by the drive motor moves the linear bearing linearly to a selected position.

16. A camera platform as claimed in claim 1 wherein the beam splitter support frame comprises a vertical component substantially parallel to the vertical support wall and a horizontal component substantially parallel to the horizontal support wall, the beam splitter support frame having a first fastening bracket on the vertical component and a second fastening bracket on the horizontal component, the first and second fastening brackets being located and configured to receive the beam splitter so that the beam splitter will be at substantially a 45 degree angle with respect to the horizontal component and the vertical component.

17. A camera platform as claimed in claim 1 further comprising at least one load bearing side wall to provide strength to the camera platform.

18. A camera platform as claimed in claim 1 wherein the beam splitter transmits about 50% of the image to be captured and reflects about 50% of the image to be captured.

19. A method of constructing a camera platform for use in three dimensional photography, the method comprising:
providing a first support wall having an inner surface, an outer surface and a fastening end;
connecting a second support wall to the first support wall, the second support wall having an inner surface, an outer surface and a fastening end, the first and second support walls being connected to each other along at least a part of their respective fastening ends so as to be substantially at right angles to each other, and the inner surface of the first support wall and the inner surface of the second support wall define a quadrant;
mounting a first camera connector to the first support wall, wherein the first camera connector is configured to connect to a first camera and to fixably hold the first camera above the outer surface of the first support wall;
mounting a second camera connector to the second support wall, wherein the second camera connector is configured to connect to a second camera and to hold the second camera above the outer surface of the second support wall, wherein the second camera connector is adjustable to move the second camera along a line that is substantially parallel to the outer surface of the second support wall and that is substantially orthogonal to a primary optical axis of a lens of the second camera; and
locating a support that is configured to hold a beam splitter on either one or both of the first support wall and the second support wall, the support configured to hold the beam splitter outside the quadrant and between the outer surface of the first support wall and the outer surface of the second support wall.

20. A method of capturing images using a camera platform for three dimensional photography comprising:
mounting a first camera on an outer surface of a first support wall having an inner surface, an outer surface and a fastening end, wherein the position of the mounted first camera is fixed;
mounting a second camera on an outer surface a second support wall having an inner surface, an outer surface and a fastening end, the first and second support walls being connected to each other along at least a part of their respective fastening ends so as to be substantially at right angles to each other, and the inner surface of the first support wall and the inner surface of the second support wall define a quadrant, wherein the position of the second camera is adjustable along a linear path that is substantially parallel to the outer surface of the second support wall and that is substantially orthogonal to a primary optical axis of a lens of the second camera;
positioning a beam splitter outside the quadrant and between the outer surface of the first support wall and the outer surface of the second support wall, wherein the beam splitter partially transmits an image to be captured to one of the first and second cameras, and wherein the beam splitter partially reflects an image to be captured to one of the second and first cameras; and
moving the second camera along the path to a desired position to achieve a stereoscopic three dimensional effect.

* * * * *